A. L. RAY.
EMERGENCY BRAKE FOR AUTOVEHICLES.
APPLICATION FILED DEC. 11, 1914.
1,148,047.
Patented July 27, 1915.
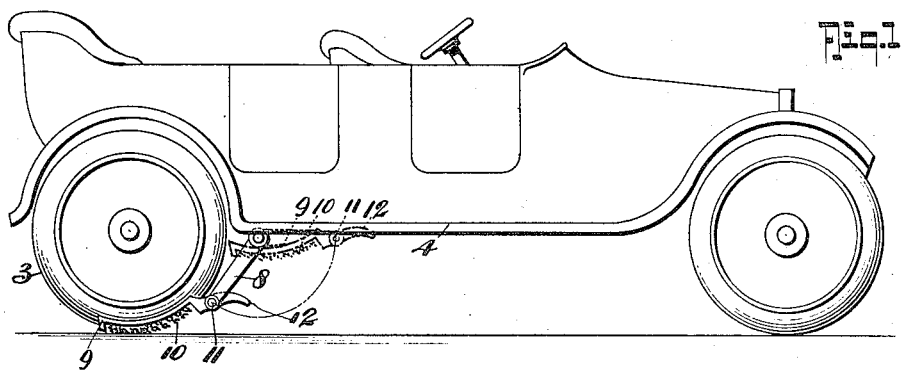
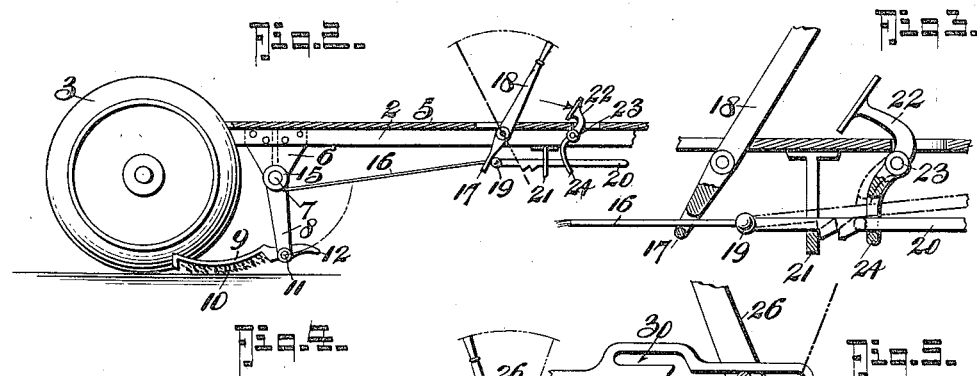
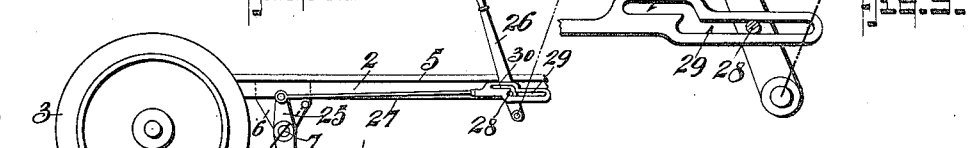
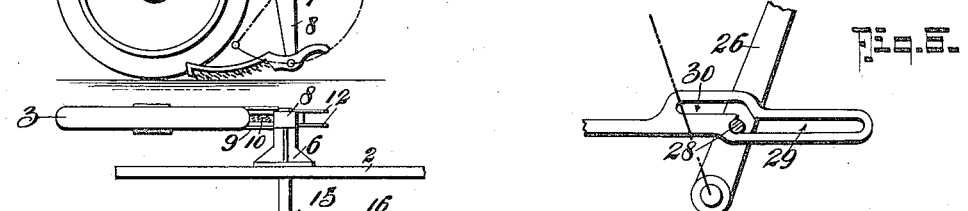
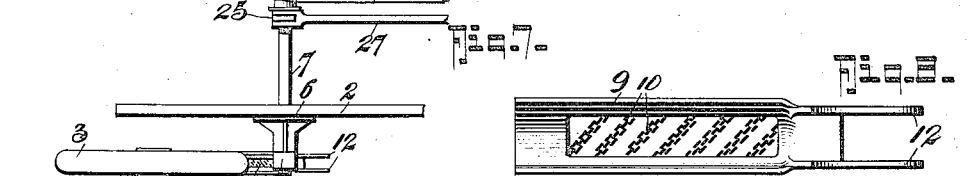
WITNESSES:
John F. Schrott
Charles J. Diller
INVENTOR
Alfred L. Ray.
BY
Fred G. Dieterich
ATTORNEYS.

UNITED STATES PATENT OFFICE.

ALFRED L. RAY, OF VICTORIA, BRITISH COLUMBIA, CANADA.

EMERGENCY-BRAKE FOR AUTOVEHICLES.

1,148,047.

Specification of Letters Patent.  Patented July 27, 1915.

Application filed December 11, 1914. Serial No. 876,721.

*To all whom it may concern:*

Be it known that I, ALFRED L. RAY, a citizen of the Dominion of Canada, residing at Victoria, in the Province of British Columbia, Canada, have invented certain new and useful Improvements in Emergency-Brakes for Autovehicles, of which the following is a specification.

This invention relates to an anti-skid emergency brake for automobiles or the like and is of that class wherein a slipper, the underside of which is provided with an anti-skid surface, is interposed when required between the tread of the wheel tires and the road surface.

As the mechanism by which the slipper is applied beneath the tire tread must necessarily move close to the road surface provision is made by which, when out of use, it may be folded up beneath the running board of the car; and as, when the anti-skid slipper is introduced under the wheels those wheels should be free from driving connection with the engine, provision is made whereby during the latter part of the movement to apply the slipper and before the slipper is introduced under the tire tread the driving clutch is coöperatively released.

The mechanism is particularly designed to be simple in construction and effective in its action and adapted for application to existing cars.

The particular means by which these results are attained is fully set forth in the following specification, reference being made to the drawings by which it is accompanied, in which:

Figure 1 shows in side elevation the slipper brake as applied to an automobile, the dot and dash lines representing the position of the brake when out of use. Fig. 2 is a sectional elevation showing the means for lifting the disengaged brake into its out of use position, for retaining it in that position and for releasing it when required. Fig. 3, an enlarged detail of the retaining means and its release. Fig. 4 is a sectional elevation illustrating the connection of the slipper operating mechanism with the engine clutch release lever. Figs. 5 and 6 are enlarged details illustrating the connection between the push rod from the slipper rocking shaft and the clutch release lever. Fig. 7 is a plan showing the rocking shaft and its attachments, and Fig. 8 is an enlarged detail in plan of the brake slippers.

In these drawings 2 represents the side frames of the car adjacent to the driving wheels which are represented by 3; 4 is the running board and 5 the bottom board or floor of the body. Mounted in brackets 6 secured to the side frames 2 to project just in advance of the driving wheels 3 is a rocking shaft 7, on each end of which a rocking arm 8 is secured in the approximate plane of each wheel 3.

Pivotally connected to the end of each rocking arm 8, which are of such length that when hanging free their lower ends are close to the road level, and projecting from them toward the tread of the wheel, is a brake slipper 9, preferably made as an open frame conforming in cross section to that of the wheel tire, and having anti-skid chains 10 of any suitable design applied across the underside of the rectangular aperture.

Projecting forward from the pivot 11 of each shoe 9 is a spur 12, which when the rocking lever is turned upward against the running board 4, will engage the underside of it and will fold the slipper 9 against the frame 2, as shown in dot and dash lines.

The rocking shaft 7 is partially rotated to lift the slippers 9 from the road level and against the underside of the running board 4, by a small diameter reel 15 secured on the shaft, as shown in Fig. 2 of the drawing, to which reel is secured a flexible line or chain 16. The other end of the line 16 passes through an eye 17 in a lever 18, which may form an extension of the emergency brake lever, and adjacent the eye is connected to an enlargement 19 on the end of a bar 20, which bar is slidable horizontally in a guide and stop 21 downwardly projecting from a convenient part of the vehicle frame.

The underside of the bar 20 is provided with notches, which by the weight of the bar will engage the member 21 through which it slides and will be retained by it.

Movement of the lever 18, as to apply the emergency brake, will by engagement of the enlargement 19 unwind the line 16 from the reel 15 and will partially rotate the rocking shaft 7 to lift the slipper brake mechanism clear of the track, and engagement of the notched underside of the bar 20 with the guide 21 will retain it in that position of elevation. If the usual emergency brake is retained the lever 18 may be returned to its normal position, the eye 17 moving on the line 16.

To free the slipper brake mechanism from this out-of-use position and permit it to fall to the road level, as indicated by the full lines in Fig. 2, a bell-crank treadle lever 22 is pivotally mounted at 23 to the floor of the vehicle and the shorter arm of this lever is connected to a lifting stirrup 24 through which the rod 20 passes, so that when the pedal is moved in the direction of the arrow the rod is lifted and the ratchet teeth of its underside are freed from engagement with the supporting member 21 and the slipper mechanism is free to fall from its upfolded position to the ground in front of the driving wheels when they will be immediately drawn under and will sustain the wear due to the stop.

In order to release the engine clutch simultaneously with the entrance of the slipper 9 under the tread of the wheel an arm 25 is secured on the rocking shaft 7 at a position in substantial alinement with the lever 26 by which the clutch is operated, and the end of this arm 25 is connected by a push rod 27 to a pin 28 projecting from the clutch lever 26, so that the movement of the rocker arms 8 move toward the wheel, as when the slipper brake is applied will move the clutch lever to release the clutch and disconnect the engine from the driving wheels of the vehicle.

Connection of the push rod 27 to the pin 28 of the clutch lever 26 is made in a particular manner, that the movement of the rocking shaft 7 in lowering the slipper arms 8 from the foot board toward the ground level may not effect the release of the clutch, but that that release is effected during the movement of the arms 8 as the slipper is forcibly drawn under the tread of the wheel; and again the connection must be such as will permit movement of the clutch lever to release when the slipper brake is in the out-of-use position, and will permit movement of the clutch lever to connect the engine to the driving wheels when the slipper brake is in action. In Figs. 5 and 6, which illustrate this connection, Fig. 5 shows the relation of the push rod end to the pin 28 of the clutch lever when the clutch is in its normal position of driving engagement and the slippers and their rocker arms are folded up under the foot boards. The slot 29 is here shown as of sufficient length to permit movement of the clutch lever to release the clutch, without that movement interfering with the slipper brake mechanism, and the elongated slot is produced backward on the other side of the normal position of the pin so that when the slipper brake mechanism is released the movement of the rocking shaft, as the rocker arms 8 fall toward the ground level, will not effect the release of the clutch; but when the slippers have fallen to the ground level the push rod will have moved until the end of its slot 29 has reached the pin 28. The further movement of the rocking shaft, as when the slippers are drawn under the tread of the wheel, will move the lever 26 over to effect release of the clutch as shown in Fig. 6.

When the stop has been effected and it is desired to withdraw the slippers provision must be made whereby the clutch lever 26 may be moved to connect the reversed engine with the driving wheels of the car. This provision exists in the supplementary slot 30 which is connected at a higher level to the adjacent end of 29 so as to leave a slight detent at the end of 29. Thus, when having reversed the engine, if the lever 26 is moved slightly farther toward the release position the push rod will fall on the pin 28 and the clutch lever will be free to move to the clutch position, the pin 28 traveling in the slot 30.

The brake is only designed to be used in an emergency and particularly where there is a liability to skid. The anti-skid provision on the underside of the slipper not being in constant use as in the case of skid chains on the wheels are not an encumbrance to the wheels under ordinary travel as are tire skid chains and do not injuriously wear the tire while it is more effective in use.

If the slipper is properly constructed to bear against the tire adjacent the pivot where it is connected to the rocker arms, the friction of a sudden stop does not impose any severe strain on the rocker shaft or on the brackets which support its bearing from the frame of the vehicle, for it will be noted that once the slippers are in place under the tread of the wheels, the wheels are stationary in relation to the slipper. The rocker shaft brackets may be braced in any suitable manner to the frame or to the axle bearings of the driving wheels.

In use, the slipper brake is carried inconspicuously under the foot board, so that it is clear of the roadway and is no disfigurement of the car, and from that position it may be immediately tripped into use by application of the foot to the pedal lever 22. After the stop has been made the engine is reversed and run backward to release the slippers and thereafter the slipper mechanism may be drawn up to its normal position by the lever 18 and will be secured in that position by the ratchet bar 20.

The mechanism is simple and direct and can be applied to existing cars without material change.

Having now particularly described my invention, I hereby declare that what I claim as new and desire to be protected in by Letters Patent, is:

1. A slipper brake for auto vehicles comprising a rock shaft mounted in bearings secured to the frame of the vehicle in front of the wheels, an arm secured to each end of said shaft, and a slipper pivotally mounted on the end of each rocker arm, said slipper including a heel and means for rocking said shaft to lower said slipper into operative position or raise said slipper whereby said heel will engage a fixed part of the vehicle to fold said slipper up against the same, substantially as shown and described.

2. A slipper brake for an auto-vehicle, comprising a rocking shaft mounted in bearings secured to the frame of the machine in front of the driving wheels, an arm secured on each end of the shaft in front of each wheel tire, a slipper pivotally connected to the end of each rocker arm, means for lifting the slippers clear of the road, means for securing the slipper mechanism in the lifted position, means for releasing said securing means, and means coöperative with the movement of the slipper under the tread of the wheel for disconnecting the engine clutch.

3. A slipper brake for an auto-vehicle, comprising a rocking shaft mounted in bearings secured to the frame of the vehicle in front of the driving wheels, an arm secured on each end of the shaft in front of each wheel tire, a slipper pivotally connected to the end of each rocker arm, means for rocking the shaft to lift the slippers clear of the road, means for securing the mechanism in the lifted position, means for releasing said securing means, and means coöperative with the movement of the slipper under the tread of the wheel for disconnecting the engine clutch while permitting free movement of the clutch lever while the slipper mechanism is in either the "out of use" or in the "in use" position.

4. A slipper brake for an auto-vehicle or the like, said brake comprising a rocking shaft mounted in bearings attached to the frame of the vehicle in front of the driving wheels, a lever secured to each end of the shaft in front of each wheel tire, a slipper pivotally connected to the end of each lever the upper surface of which slipper conforms approximately to the cross section and circumference of the tire of the wheel and the surface which contacts with the road is provided with anti-skid devices, means operative from the position of the driver for folding the rocking shaft arms and their connected slippers up under the foot board of the vehicle, means operative from the same position for releasing the slipper mechanism and permitting it to fall into action, and means coöperative with the slipper mechanism for releasing the engine clutch while the slipper is passing under the tread of the tire.

5. A slipper brake for an auto-vehicle, comprising a rocking shaft mounted in bearings attached to the frame of the vehicle in front of the driving wheels, an arm secured to each end of the shaft in front of each wheel tire, a slipper pivotally connected to the end of each arm and adapted to pass under the tread of the driving wheels, said slipper having a spur projection from the opposite side of the pivot, means for lifting the rocker arms and their connected slippers under the running board of the vehicle to bring said spurs into engagement with the running board to fold said slippers against the same, means for retaining it in such position, and means for releasing it from such engagement.

6. A slipper brake for an auto-vehicle, comprising an elongated open rectangular frame conforming generally in cross section to the tire of the vehicle and having anti-friction chains across the rectangular aperture, and means for introducing the slipper under the tread of the driving wheels of the vehicle.

7. A slipper brake for an auto-vehicle, said brake comprising a rocking shaft mounted in bearings attached to the frame of the vehicle in front of the driving wheels, an arm secured to each end of the shaft in front of each wheel tire, a slipper connected to the end of each arm and adapted to pass under the tread of the driving wheel, a reel secured on the shaft intermediate of its bearings, a flexible line secured to the reel and passing around its underside, a handle lever pivoted adjacent the driver's seat in the vehicle, said lever having an eye through which the other end of the line passes, a bar having ratchet teeth on the underside and an enlargement to which the line is connected adjacent the eye of the lever, a guide having an aperture through which the ratchet bar may slidably pass and against which the teeth of the bar will engage to retain the line when drawn tight by the lever, and a treadle lever having a stirrup end through which the end of the rack bar passes.

In testimony whereof I affix my signature in presence of two witnesses.

ALFRED L. RAY.

Witnesses:
ROWLAND BRITTAIN,
MAY WHYTE.